Jan. 10, 1939.    W. L. MYERS    2,143,278
ELECTRIC CONDUIT BOX AND ITS ATTACHABLE ACCESSORIES
Filed April 8, 1936    2 Sheets-Sheet 1

Wilmer L. Myers
INVENTOR.

BY

ATTORNEYS.

Witness
J. C. McClure, Jr.

Jan. 10, 1939.  W. L. MYERS  2,143,278
ELECTRIC CONDUIT BOX AND ITS ATTACHABLE ACCESSORIES
Filed April 8, 1936  2 Sheets-Sheet 2
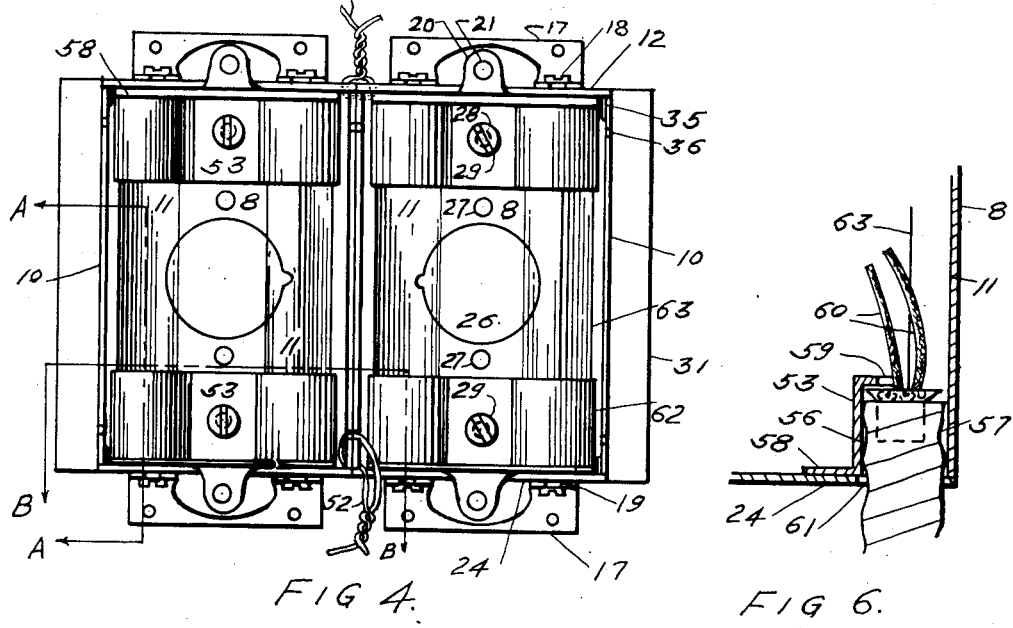
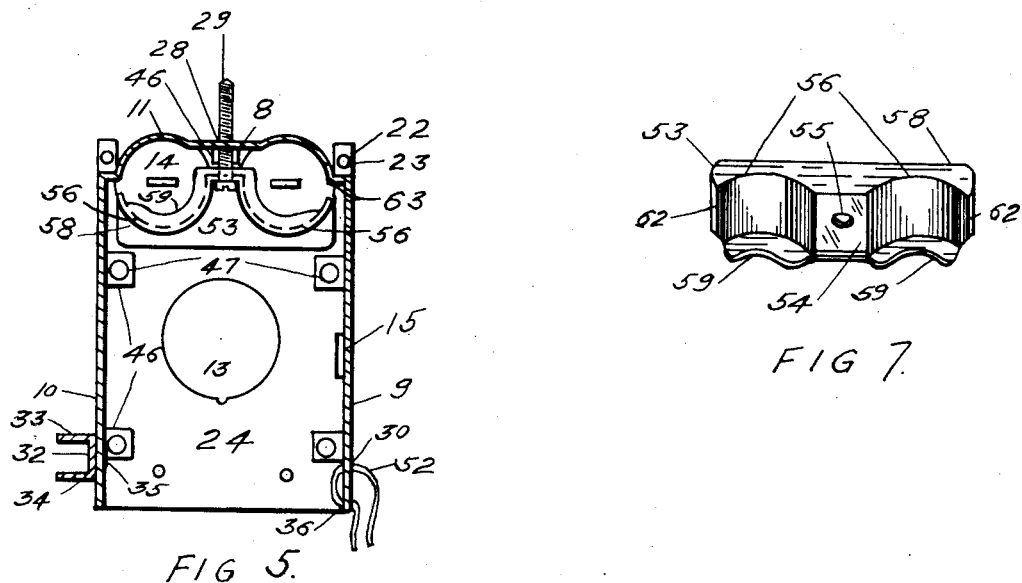
Wilmer L. Myers
INVENTOR.
Witness
J. C. McCluer, Jr.
BY
ATTORNEYS.

Patented Jan. 10, 1939

2,143,278

UNITED STATES PATENT OFFICE 2,143,278

ELECTRIC CONDUIT BOX AND ITS ATTACHABLE ACCESSORIES

Wilmer Louis Myers, Alexandria, Va.

Application April 8, 1936, Serial No. 73,226

15 Claims. (Cl. 247—15)

My invention relates to improvements to electric conduit boxes and their attachable accessories.

One object of the invention is to make an electric conduit box of maximum interior free space and minimum exterior space requirements, and having a minimum of sharp corners and pockets inside so as to readily adapt itself to the stuffing of insulated wires therein.

A further object of the invention is to provide a device integrally formed with an electric conduit box structure and adapted to engage a cheap and convenient accessory, manually attachable without a tool, for fastening said electric conduit box to a surface or the like.

A further object of the invention is to reduce the time required to install electric conduit boxes.

A further object of the invention is to adapt one type of box to be used in several different positions in a building, either new or old, where two or more types would be required hitherto.

Other objects and advantages of the invention will be apparent during the course of the following description.

In the accompanying drawings, forming a part of this specification, and in which like numerals are employed to designate like parts throughout the same, Figure 1 is an oblique view of an electric conduit box of the switch or receptable type embodying certain features of my invention, Figure 2 is a perspective view of the bracket alone.

Figure 4 is a plan of two of my boxes "ganged" together,

Figure 5 is a section of a single box with ganging wire inserted, taken on plane B—B of Figure 4, Figure 6 is a detail section on plane A—A of Figure 4, and Figure 7 is a detail perspective of my clamp, looking toward its interior.

Figure 1:
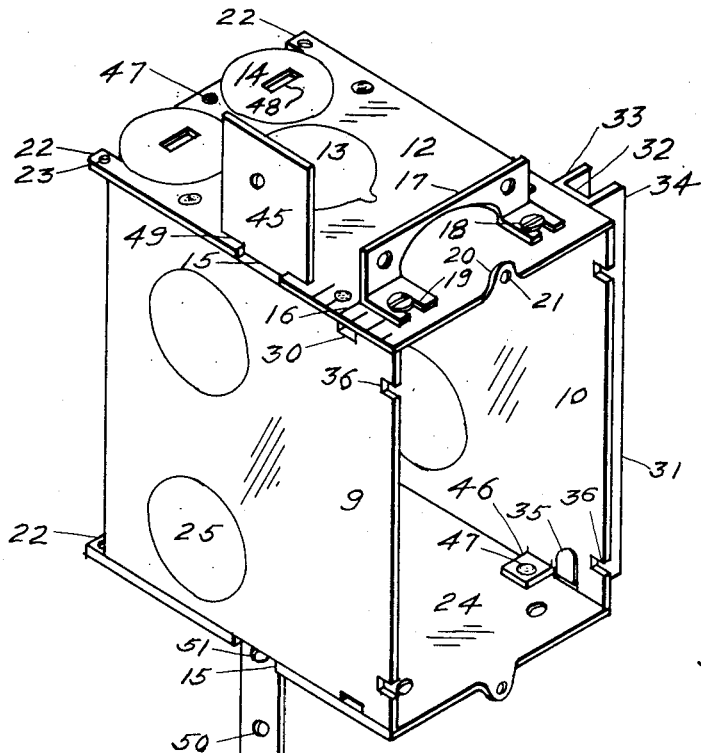

Referring to Figures 1, 4, and 5, it is seen that my electric conduit box is roughly rectangular in shape and open at the front. A U-shaped unit makes up the backwall 8 and sidewalls 9 and 10. Said unit may be made from a single piece of sheet material bent or pressed into the form shown in Figure 5 after all necessary knockouts, lugs, and apertures have been formed in the sheet.

Recess 11 is adapted to receive conduit or the like, and is formed preferably in a sheet surface of backwall 8 and facing toward the front of the box, extending at an angle to the small ends of the box along an axis parallel to the conduit it is designed to hold. It may be positioned anywhere along backwall 8, preferably as shown and adapted to receive two conduits in each end. It will be observed that the drawings Fig. 4 show a flat central portion connecting the two curved portions of recess 11. The location of this flat central portion may be farther forward in the box as manufactured in order to deepen the exterior groove between the curved portions of recess 11, through which groove the exteriorly extending portion of screw 29 passes.

Upper endwall 12 is of stamped sheet material. It embodies a knockout 13, and two pryouts 14, and has an aperture 15 at one edge contiguous to sidewall 9. It carries a scale 16 gauged along one edge and measuring from the front of the box backwards in a direction parallel to the front-to-rear axis of the box. It has rearwardly extending lugs 22 which project behind backwall 8 and have holes 23 therein to assist in "ganging" boxes, as described herewith in another paragraph. It also has an ear 17 attached thereto by screws 18 engaging slots 19 in the ear. This makes it possible to adjust ear 17 in or out for the purpose of bringing the box front flush with the surface of a wall in which the box is set. Upper endwall 12 also has a lug 20 containing screwseat 21 attached at an angle on its front edge center in alignment with a similar lug 20 on lower endwall 24. It is seen that this pair of lugs may be used to insert various devices within the box by means of two screws (not shown) after the box is assembled in a building structure. I am aware that both the ear 17 and the central lug 20 just described are products of the prior art.

Lower endwall 24 is exactly like upper endwall 12 except that aperture 15 is reversed to the opposite edge in order to align with aperture 15 of upper endwall 12. However, I do not limit myself to endwalls having but one aperture 15. As will be understood, a similar aperture may be provided at the opposite edge of each endwall, and in this event both endwalls become identically alike.

Figure 1 shows that sidewall 9 contains at least one knockout 25. Sidewall 10 is similar to sidewall 9 in this feature. So it is seen that my box comprises two pryouts and one knockout in each endwall and at least one knockout in each sidewall. It will be observed that sidewalls 9 and 10 each have symmetrically-positioned apertures 30 struck in their top and bottom edges contiguous to endwalls 12 and 24. They also have (symmetrically-positioned) apertures 36 struck in their front face edges to facilitate "ganging" of boxes as fully described in another paragraph herewith.

Attached to one sidewall 10, preferably that one opposite to aperture 15, is a channel member 31, comprising a web 32 and two channel walls 33 and 34. It is made no longer than the box proper, and is fastened to sidewall 10 securely by lugs 35 struck in web 32, passed through apertures 30, and bent over against sidewall 10. Such channel members are old in the art, but have not been known before in combination with elements such as I claim herewith. They serve as pockets within which interrupted lath ends abutting the box may repose. This insures firmness of the finished building wall surface.

Referring to Figure 4, we see that backwall 8 contains knockout 26, a plurality of apertures 27 adapted to receive fasteners such as screws, and two screwseats 28 positioned properly to receive the clamp screws 29 herewith described and shown.

Endwalls 12 and 24 are fastened rigidly to sidewalls 9 and 10 and to back wall 8 by any means known to the art. Care is observed when manufacturing the box that its exterior sidewall faces constitute substantially plane surfaces without any lateral projections other than channel member 31, said channel member being separably attachable.

Pryouts 14 are curvilinear pieces positioned over the ends of recess 11 and struck in endwalls 12 and 24 in such a manner that portions of their boundary edges are portions of the boundary edges of the wall which contains them. Screwdriver slots 48 (Figure 1), preferably centrally located in pryouts 14 constitute a means for prying them out of their position, leaving holes through which conduit ends may be entered to recess 11.

It is thought that prior art and terminology differentiate sufficiently between the words "knockout" and "pryout" to avoid confusion in the mind of one skilled in the art. But to insure that there shall be no confusion, the word "pryout" as used herein refers to a knockout comprising a slot for prying it loose from the wall containing it. "Knockout" is therefore a general term inclusive of "pryout."

In the construction of conduit systems it is not always known in advance whether rigid or flexible conduit will be used. Prior boxes of the switch outlet type have not provided entrance means for two or more sizes of conduit of branch circuit capacity. It is desirable to have on the market an outlet box adapted to either type of conduit and to more than one size. The box shown in my drawings is so adapted. Pryouts 14 may be of a size to fit commercial flexible conduit, while knockout 13 may be of a size to fit ordinary rigid conduit of small diameter, or to fit a commercial "BX" connector attached to the end of flexible conduit. The location of pryouts 14 in such a manner that their boundary edges are partially boundary edges of endwall 12 leaves a large blank space in the endwall. Knockout 13 is located at or near the center of endwall 12, occupying part of this blank space, and at the same time far enough back of the front face of the box to permit insertion of wire at knockout 13 and installation of a switch or receptacle within the box without damage to said wire.

My fastening strip 45 is of stiff thin metal, is longer than the box to be fastened, and has at least one offset portion 49 near one end and holes 50 through which fasteners may be passed. Hole 51 is provided at a spaced distance from the end of strip 45. It is believed that this strip is cheap, quickly assembled with the box, and effective.

Strip 45 is assembled with the box by inserting its straight end into aperture 15 in endwall 12, passing it through the box and out through aperture 15 in endwall 24, said apertures being in alignment for that purpose, until offset 49 strikes the endwall 12. This is a hand operation, no tool being required. A nail or the like may be inserted through hole 51 to prevent backslip, said hole 51 being at such a distance from the end of strip 45 that it is adjacent to endwall 24. Nails or other fasteners then are passed through holes 50 and into the surface (usually the side of an upright building stud) to which the box is to be attached, holding sidewall 9 tightly pressed against the surface. During this operation the scale 16 constitutes a means whereby the box front face may be positioned any desired distance beyond the front edge of the building member to allow for plaster thickness or the like, bringing the box front face flush with the building wall when it is finished.

Figure 2:
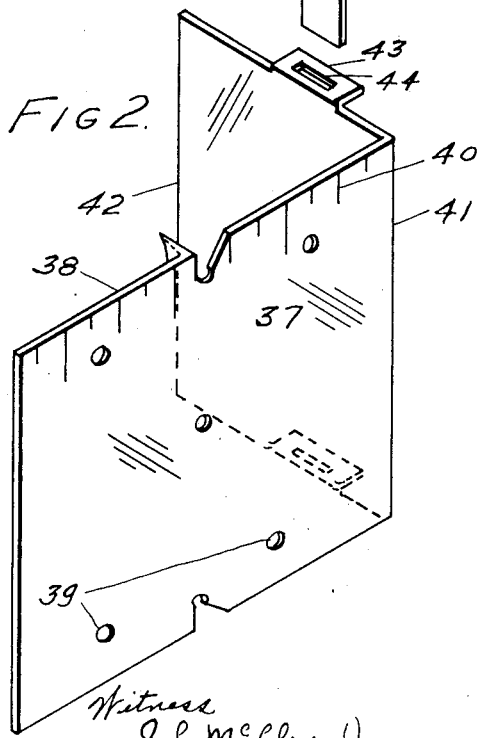
Figure 3:
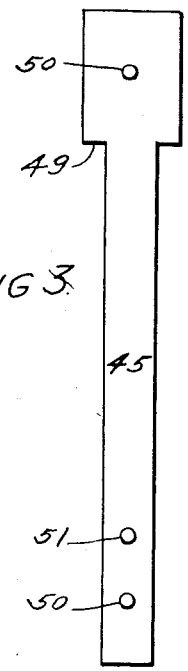
Figure 3 is a plan of my fastening strip alone.

Referring now to Figure 2, the bracket 37 comprises a piece of strong sheet material formed into two wings 38 and 42 at right angles to each other. The longer wing 38 has apertures 39 therein to receive nails or other fasteners. The longer wing also carries along one edge a gauged scale 40 measuring from the angle apex 41 outward. This scale is convenient for equalizing the offset distances of a number of boxes from a door or window trim. The short wing 42 is as high as the box for which it is designed and has aligned lugs 43 on its opposite free edges, in which lugs are aligned apertures 44. The lugs 43 are spaced apart sufficiently to fit snugly over the box ends 12 and 24 and in this position the apertures 44 in the brackets are aligned with the apertures 15 in the endwalls.

When the bracket 37 is positioned to place its apertures 44 in alignment with the apertures 15, the strip 45 is passed through all of such apertures to lock the bracket to the box with a minimum of free play therebetween. The ends of the strip 45 may be overturned upon the endwalls to reduce the overall height of the assembly and to secure the strip against displacement. The bracket 37 and/or the strip 45 can, therefore, be attached to the box without the use of tools other than the human hand.

Referring to Figures 1, 4, and 5, two similar boxes are ganged by first removing aligned knockouts 25 from sidewall 9 of each box, then wiring the sidewalls 9 of separate boxes together with strong wire 52. For this purpose lugs 22 having apertures 23 are provided. Referring to Figure 1, symmetrically-positioned apertures 30 and 36 are also provided in each sidewall. After ganging the boxes appear as in Figure 4. Twisted ends of wire 52 at the front of the box are stuffed within the box, leaving no projections beyond its face edges. Such wired construction at two diagonal corners of sidewall 9 is sufficient to maintain correct face and end alignment of two boxes.

If the mechanic so desires, he may select those sides of the boxes which carry channel members 31 to be assembled contiguously. Channel members 31 are readily removed from each box by inserting a screwdriver between sidewall 10 and web 32 of the channel member and twisting or prying it free, lugs 35 being weak enough for this purpose.

Another method of securing either single or ganged boxes within a building wall is by means of apertures 27 in the backwall used in conjunction with fasteners screwed to a cross member in the wall of the building.

It will be observed that it is desirable for knockouts 25 to be positioned in such a manner as to maintain proper alignment of openings formed when they are removed for ganging purposes. All walls remain on the boxes when ganged, resulting in minimum time consumed in the operation, and eliminating the need for expensive detachable walls. It is obvious that more than two boxes can be ganged similarly.

Referring now to Figures 4, 5, 6, and 7, the numeral 53 designates a clamp, comprising a pressed metal strip 54 with a hole 55 (Figure 7) positioned in its center, through which a screw 29 passes and engages screwseat 28 (Figure 5) in backwall 8 when the clamp is assembled within the box. The clamp has indentations 56, preferably curved, pressed transversely into its end portions and adapted to grip a conduit end 57 (Figure 6) cooperatively with recess 11 in backwall 8 when screw 29 is tightened. It also has a flange 58 on one of its longer edges turned outwardly to its indentations 56, and another flange 59 on its opposite long edge turned inwardly to its indentations 56. Flange 59 may have curved notches in its edge to enlarge the opening through which wires pass to the interior of the box, as shown. Lower clamp 53 is substantially similar to upper clamp 53 and is interchangeable therewith.

Referring to Figure 6, the assembly of a conduit end 57 into the box is accomplished by removing a pryout 14 (Figure 5) at the end of recess 11, leaving a hole 61, pushing the conduit end 57 through said hole until it jambs against flange 59 of clamp 53, the ends of any conductors 60 contained in conduit 57 passing at the same time beyond flange 59 and within recess 11 without injury. Screw 29 is then tightened, thus moving clamp 53 bodily toward and against conduit 57, shoving said conduit into recess 11, and gripping it between bearing surfaces of recess 11 and clamp 53. Flange 58 stiffens clamp 53, is in contact with a box endwall, and serves to close any part of the hole 61 remaining when clamp 53 is tight. It is obvious that two conduit ends may be clamped by tightening a single screw. In this event, each conduit forms a jamb for the clamp, and since such conduits are of equal diameter, the screw 29 will remain perpendicular to backwall 8 throughout its adjustment. In the event however that only one conduit enters the clamp, it is necessary to prevent screw 29 from getting out of perpendicular to backwall 8, thereby stripping threads. This is accomplished by making the clamp 53 of such width that its ends 62 overlap shoulders 653 of recess 11 and jamb against them when screw 29 is tightened on an empty clamp. This construction saves time of the mechanic, for the screw need be tightened only a short distance before clamp 53 grips, whether it grip one or two conduit ends.

The fact that recess 11 is preferably at the extreme rear of the box, and that conduit 57 when clamped in place is only partially in front of shoulder 63 of recess 11, results in maximum free space within the box, permits the use of a short clamping screw, and disposes entering conductors most favorably for subsequent distribution on the interior. Since there are a minimum of sharp corners and useless pockets within the box, insulated wires may be stuffed therein with less damage to insulation than in prior boxes.

I do not limit myself to a switch outlet box in the application of my recess, clamp, or pryout structure. They are applicable to any electric conduit box. A substantial advantage is gained by the use of such a combination in construction of rigid conduit systems. Formerly such conduit was required to be cut and threaded to exact measured length for neatly joining to boxes, or else separate threadless connectors were necessary. My construction eliminates the necessity of threading conduit and/or cutting it to exact measured length. At the same time it eliminates the use of separate connectors and provides assembled with the box a means for electrically and mechanically securing ends of conduit to the box, and substantially closing the breach in the wall through which the conduit is entered.

Previous types of switch outlet box clamps have been designed to handle only flexible cable. Their structure has consisted of a recessed edge of a box wall pressing against one side of a cable, and a movable clamping element screwing up against the other side, by means of a screw engaging a screwseat in a flat wall. This has the disadvantages that it throws the cable end out of alignment with the remainder of the cable, and that it puts too much clamping stress on the small area of cable engaging a thin edge of a wall. Should the mechanic make an error and clamp a ridge of the cable armor against the recessed edge instead of a furrow of the armor, a slight longitudinal displacement later may loosen the cable, causing poor electrical and mechanical connection to the box. Such structure is inadequate to clamp rigid conduit because of the small clamping area engaged and because of the bending of the conduit end out of alignment. Such construction also wastes space within the box and often leaves awkwardly protruding structures with sharp corners. In my conduit box these disadvantages are overcome by forming recess 11 in a sheet surface of a wall rather than in an edge of it, by shaping both clamp 53 and recess 11 to conform approximately to the shape of conduit, and by so locating pryout 14 that when it is removed and a conduit inserted said conduit will lie against the sheet surface of recess 11 throughout the entire length of the portion inserted. Thus uniform non-excessive pressure is applied against a conduit wall or sheath, a permanent positive grip is assured, and either rigid or flexible conduit may be clamped with equal facility in such a manner as to conserve space within the box for stuffing wires. Thus it is clearly shown that my recess, clamp, and pryout structure are not limited to the type of box shown in my drawings, but may be applied to any electric conduit box. Especially in large industrial boxes can a great saving in time, labor, and materials be effected.

The structural elements of my box and accessories and their assembly have now been completely described. The single result of these various cooperating elements is an electric conduit box with attachable accessories, offering to the mechanic who installs it maximum convenience, strength, adaptability to different locations in old or new building structures, and low cost.

I shall explain now how my box adapts itself to various positions in a building. The box may be taken to the job disassembled, that is, strip 45 being carried separately from the box proper, and all other elements of the box being assembled with it at the factory. It is desirable that ears 17 be furnished rotated horizontally through 180°. Assume we are building a new structure. To locate the box in a blank well before lath and plaster are in, strip 45 is inserted in the box and then fastened to the side of a stud or wall member, the box face being at a projected distance in front of the stud face as measured by scale 46 approximately equal to desired lath and plaster thickness, the latter being installed later. Lath ends interrupted by the box repose in channel member 31, resulting in wall rigidity and preventing plaster from cracking around the box. Ears 17 may be left on to strengthen the plaster at its joint with the box endwalls, and to provide a firm seat for the ears of a switch, receptacle, or other device that is to be installed within the box.

For those upright locations in walls near door or window trim, I may use the bracket 37 and strip 45 in combination, gauging the offset from proposed trim by scale 40 in order to maintain uniform offsets throughout the building.

For positions not near any wall upright member, I may place a crossmember between wall uprights and fasten the backwall of the box thereto by means of apertures 27. In this instance we have saved a bracket and strip, reducing cost of the total installation.

Assuming it is desired to wire an old building with lath and plaster walls. For upright locations in walls bracket 37 and strip 45 may be used with the box. A hole is cut in the lath plaster near an upright, said hole being large enough to slip the box in, allowing interrupted lath ends to repose in channel member 31. Bracket 37 is fastened to the face of the building upright member. Necessary plaster patching is thus minimized.

Again, for location in a floor or wooden baseboard, we may remove channel member 31, cut a ho'e just large enough to slip the box in, and fasten it by ears 17 to the wood. In this instance bracket and strip are saved, reducing total costs.

Single, double-ganged, or multiganged boxes may be fastened within walls or partitions of buildings by means of any one of four devices combined in my single-structured box and accessories, namely, ears 17, strip 45, bracket 37 and strip 45, or apertures 27 with fasteners therethrough. The choice rests with the mechanic installing same. Obviously a mechanic supplied with this one type of box and accessories is adequately prepared to meet any ordinary demands for switch and receptacle box installations.

It is to be understood that the forms of my invention herewith shown and described are to be taken as preferred examples of the same, and that various changes in the shape, size, and arrangement of parts my be resorted to without departing from the spirit of my invention, or the scope of the subjoined claims.

Having thus described my invention, I claim:

1. A junction box having the back wall thereof deformed to provide recesses having wall portions conforming to the shape of the lead in conduits, said recesses spaced from the side walls of the box sufficiently to provide shoulders therebetween, and clamping means shaped to partially encircle said conduits and having portions for engaging said shoulders in the event only one conduit is being used whereby objectionable canting of said clamp is prevented.

2. In an electric conduit box a wall having a recess formed in an inner sheet surface thereof, shoulders extending longitudinally along each side of the recess, and a clamp comprising a short screw in engagement with said wall and having ends which overhang said shoulders, whereby the travel of said clamp is confined to close limits in order to save time when only one conduit is clamped.

3. In an electric conduit box two flat walls angularly adjoining each other at the edge portions, means for holding said walls in fixed angular adjoinment, one of said walls having in its edge portion a niche which coacts with a contiguous corner of the edge of said second wall to form a totally encompassed aperture, adapted to be slidingly engaged by a separable supporting element.

4. In an electric outlet box a flat wall adjoining at right angles and overlapping the edge of a second flat wall, said first wall having struck out near the middle of its overlapping portion a rectangular niche deeper than the thickness of said second wall which niche coacts with the adjacent inside corner of the edge of said second wall to form a four-sided rectangular aperture adapted to be slidingly engaged by a separable box-supporting element.

5. An assembled electric outlet box comprising flat walls and having spaced axially aligned apertures mutually contiguous to one of its walls at opposite edges thereof, said apertures being adapted to receive means for supporting the box.

6. As an article of manufacture, a sheet metal electric conduit box comprising one member of substantially a channel section, the legs of which constitute the side walls of the box and the bight of which is formed with longitudinal corrugations of circular arc section, end walls for the box, the bottom portion of each end wall being provided with knockouts, the center of each knockout being aligned with the axial center of one of the corrugations, whereby when a knockout is removed, the end of a conduit may be received in the corrugation.

7. As an article of manufacture, a substantially rectangular outlet box having flat side walls, aligned apertures in opposite end walls immediately adjacent a side wall, and a support strip of length greater than the box length, and extending through the said apertures.

8. An electric conduit box comprising a unitary built-up member of substantially channel section constituting three walls of the box, the bight portion of which is provided with a longitudinal recess, endplates closing the ends of the channel member to complete the box, the portion of each endplate adjacent the recess being provided with at least one knockout in alignment with said recess, and means for joining the endplates to the channel member.

9. In an electric conduit box, a wall having a recess formed in an inner surface thereof, an endwall in a plane cutting the plane of said wall and having openings therein for the introduction of a cable end into said recess, a movable clamp adapted to hold a conduit end tightly within said recess, said clamp having a face opposite said recess shaped to conform to a cable, said clamp having a flange extending away from said recess at the side of the clamp adjacent the endwall whereby the flange engages the inner face of said endwall slidably to guide the clamp and to maintain the face thereof parallel to said recess, said clamp further having a flange extending towards said recess from the side of the clamp remote from said endwall whereby a cable end inserted into the recess through said endwall is stopped after it has traversed the face of said clamp.

10. As an article of manufacture, a sheet metal electric conduit box comprising a rearwall having a concave cable seat extending transversely thereof and opening at the edge of said rearwall, and an endwall for the box provided with a knockout aligned with the cable seat of the rearwall to cover the same, said endwall terminating forwardly of the cable seat in the rearwall whereby said knockout has the rear portion of its periphery free to leave a wholly unobstructed entrance into said cable seat when the knockout is removed.

11. An electric outlet box comprising opposed endwalls with aligned apertures therein, a bracket including two wings connected at right angles to each other, a pair of lugs extending at angles from one of said wings spaced apart sufficiently to fit over the opposite endwalls and said lugs having slots therein for registry with the apertures in the endwalls, and a strip adapted to be slidably inserted through said slots and apertures to lock said bracket to the box.

12. An electric outlet box comprising a sidewall, endwalls at an angle to said sidewall, said endwalls having aligned apertures adjacent a sidewall, a bracket with two wings connected at right angles to each other, a pair of spaced slotted lugs extending at angles from one of said wings and disposed to fit over the endwalls and to have the slots therein in registry with the apertures in said endwalls when said one wing is placed against the sidewall adjoining the apertures, and a bendable strip adapted to be inserted through said slots and apertures and to be bent over upon the endwalls to secure the bracket to the box.

13. As an article of manufacture, a sheet metal electric conduit box comprising one member of substantially channel section, the legs of which constitute the side walls of the box and the bight of which is formed with a longitudinal corrugation of circular arc section, end walls for the box, the bottom portion of an end wall being provided with a knockout the center of which is aligned with the axial center of the corrugation, whereby when said knockout is removed, the end of a conduit may be received in the corrugation.

14. As an article of manufacture, an outlet box having a flat side wall, opposite end walls adjoining said side wall and having aligned apertures immediately adjacent said side wall, and a support strip extending through said apertures and lying against the inner face of said side wall, said strip having an offset portion at one end adapted to abut an endwall to limit the movement of the strip through the apertures.

15. A sheet metal electric conduit box comprising a fixed rear wall having two concave seats conforming substantially to the shape of a conduit, a wall portion connecting said seats and extending forwardly thereof to provide an exterior groove between the backs of said seats, said wall portion having a screwseat opening into said groove, a movable conduit clamp disposed within the box opposite said seats, a screw extending freely through said clamp and engaging said screw seat and having its head disposed within the box to make it operable from the front of the box, the exteriorly extending portion of said screw passing within said groove, whereby exterior projection of the screw beyond the backs of said seats is reduced.

WILMER LOUIS MYERS.